United States Patent
Kim et al.

(10) Patent No.: US 10,712,713 B2
(45) Date of Patent: Jul. 14, 2020

(54) SMART WATCH

(71) Applicant: LG ELECTRONICS INC., Seoul (KR)

(72) Inventors: Jaewook Kim, Seoul (KR); Taekyung Jung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 183 days.

(21) Appl. No.: 15/938,483

(22) Filed: Mar. 28, 2018

(65) Prior Publication Data

US 2019/0204790 A1  Jul. 4, 2019

(30) Foreign Application Priority Data

Dec. 29, 2017  (KR) .......................... 10-2017-0183645

(51) Int. Cl.
*G04G 9/00* (2006.01)
*F21V 8/00* (2006.01)
(Continued)

(52) U.S. Cl.
CPC ............. *G04G 9/007* (2013.01); *G02B 6/004* (2013.01); *G02B 6/0068* (2013.01);
(Continued)

(58) Field of Classification Search
CPC ........ G04G 9/007; G04G 17/06; G04G 9/128; G04G 9/124; G04G 99/006; G04G 9/06;
(Continued)

(56) References Cited

U.S. PATENT DOCUMENTS 5,984,485 A * 11/1999 Poli .................. G04B 19/30
                                                362/23.15
2005/0111239 A1  5/2005 Hosobuchi
(Continued)

FOREIGN PATENT DOCUMENTS

KR  2020090004821  5/2009

OTHER PUBLICATIONS

PCT International Application No. PCT/KR2018/003719, Notification of Transmittal of the International Search Report and the Written Opinion of the International Searching Authority, or Declaration dated Sep. 28, 2018, 11 pages.

*Primary Examiner* — Edwin A. Leon
(74) *Attorney, Agent, or Firm* — Lee, Hong, Degerman, Kang & Waimey

(57) ABSTRACT

The present invention provides a smart watch, including a case; a window for covering a front surface of the case; a display unit mounted inside the window and including a center hole formed at a center thereof; a movement located on a rear surface of the display unit and including a shaft that passes through the center hole; a watch hand located between the display unit and the window and rotating by being connected to the shaft; and a main board for controlling the display unit and the movement, wherein the display unit includes: a liquid crystal panel; a light guide plate located on a rear surface of the liquid crystal panel; and a first light source located at one side of the light guide plate and a second light source located at the other side of the light guide plate, and wherein the center hole is located at a center of the first and second light sources.

14 Claims, 9 Drawing Sheets

(51) Int. Cl.
*G02F 1/1333* (2006.01)
*G04B 19/04* (2006.01)

(52) U.S. Cl.
CPC ....... *G02F 1/133308* (2013.01); *G04B 19/04* (2013.01); *G02F 2201/56* (2013.01)

(58) Field of Classification Search
CPC ...... G04G 9/0082; G04G 9/0041; G04G 9/12; G04G 9/122; G04G 17/045; G04G 21/04; G02B 6/004; G02B 6/0068; G02F 1/133308; G02F 2201/56; G02F 1/1368; G02F 1/133514; G04B 19/04; G04C 17/00; G04C 17/02; G04C 17/0091; H04M 1/0266; H04M 1/7253
See application file for complete search history.

(56) References Cited

U.S. PATENT DOCUMENTS

| | | | |
|---|---|---|---|
| 2006/0083476 A1* | 4/2006 | Winkler | G02B 6/0018 385/146 |
| 2006/0164821 A1* | 7/2006 | Usui | G04B 19/32 362/23.17 |
| 2007/0109918 A1* | 5/2007 | Furetta | G02F 1/1335 368/294 |
| 2015/0241852 A1* | 8/2015 | Yang | G04G 17/08 368/223 |
| 2016/0313593 A1* | 10/2016 | Grip | G02F 1/13452 |
| 2017/0010407 A1* | 1/2017 | Huang | G02B 6/0068 |
| 2017/0097614 A1 | 4/2017 | Kang et al. | |
| 2017/0261938 A1 | 9/2017 | Cho et al. | |
| 2017/0329286 A1 | 11/2017 | Ji | |

\* cited by examiner

SMART WATCH

CROSS-REFERENCE TO RELATED APPLICATIONS

Pursuant to 35 U.S.C. § 119(a), this application claims the benefit of earlier filing date and right of priority to Korean Patent Application No. 10-2017-0183645, filed on Dec. 29, 2017, the contents of which are hereby incorporated by reference herein in its entirety.

BACKGROUND OF THE DISCLOSURE

Field of the Disclosure

The present invention relates to a smart watch having analog watch hands.

Background of the Disclosure

Terminals may be generally classified as mobile/portable terminals or stationary terminals according to their mobility. Mobile terminals may also be classified as handheld terminals or vehicle mounted terminals according to whether or not a user can directly carry the terminal.

Smart watches have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

As such functions become more diversified, the mobile terminal can support more complicated functions such as capturing images or video, reproducing music or video files, playing games, receiving broadcast signals, and the like. By comprehensively and collectively implementing such functions, the mobile terminal may be embodied in the form of a multimedia player or device.

In addition, various types of mobile terminals have appeared in recent years. For example, as well as a handheld mobile terminal, a smart watch has appeared as a terminal wearable on the body. However, in the case of the smart watch, since design is an important factor, it has a problem that if a display unit is deactivated, its appearance is degraded due to a dimmed disk. Nevertheless, the display unit cannot be activated at all times due to battery capacity.

SUMMARY OF THE DISCLOSURE

Accordingly, the object of the present invention is to provide a smart watch for using a metal structure disposed thereon as an antenna.

In an aspect of the present invention, provided herein is a smart watch, including: a case; a window for covering a front surface of the case; a display unit mounted inside the window and including a center hole formed at a center thereof; a movement located on a rear surface of the display unit and including a shaft that passes through the center hole; a watch hand located between the display unit and the window and rotating by being connected to the shaft; and a main board for controlling the display unit and the movement, wherein the display unit may include: a liquid crystal panel; a light guide plate located on a rear surface of the liquid crystal panel; and a first light source located at one side of the light guide plate and a second light source located at the other side of the light guide plate, and wherein the center hole may be located at a center of the first and second light sources.

The display unit may include a light incident part protruded at positions corresponding to the light sources.

The display unit may further include a circular activation area and a deactivation area located along a circumference of the activation area, and the light incident part may be included in the deactivation area.

Each of the first and second light sources may include a pair of LEDs, the light guide plate may form a scattering pattern in a portion corresponding to the activation area on a rear surface thereof, and the scattering pattern may have the lowest intensity at a hot spot, which is close to the light incident part and located on a straight line passing through the center hole and the center of the first and second light sources.

The display unit may further include black liquid crystal frames located along a side circumference thereof and along a side circumference of the center hole.

The smart watch may further include a connection board, of which one end is connected to the main board and the other end is located on the rear surface of the display unit, and the display unit may include: a metal plate located on the rear surface thereof; a first display board extended from the first light source to the connection board; and a second display board extended from the second light source to the rear surface of the display unit and combined with a connector of the connection board.

The connection board may include a grounding pad exposed outwards at a position facing the rear surface of the display unit, and the smart watch may include a conductive tape located between the grounding pad and the metal plate.

The smart watch may further include a spacer located between the metal plate and the second display board, and a thickness of the spacer may be equal to or greater than that of the conductive tape.

The movement may include a driving part for rotating the shaft, and wherein the driving part may include a gear part connected to the shaft; a magnet connected to the gear part and rotating; a first electromagnet disposed at one side of the magnet and controlling clockwise rotation of the magnet; and a second electromagnet disposed at the other side of the magnet and controlling counterclockwise rotation of the magnet.

The first and second electromagnets may be disposed such that a spacing at one side where the magnet is located therebetween is greater than that at the other side.

The watch hand may include a first watch hand and a second watch hand, the shaft may include a first shaft connected to the first watch hand and a second shaft connected to the second watch hand, and at least part of the second shaft may be located inside the first shaft.

The driving part may include a first driving part for controlling rotation of the first shaft and a second driving part for controlling rotation of the second shaft, and a magnet of the first driving part and a magnet of the second driving part may be disposed such that the magnets and the shaft are located on a straight line.

The smart watch may further include a ring type of dial mold located between the window and the display unit and having a thickness greater than that of the watch hand.

The display unit may use a liquid crystal display.

Accordingly, the present invention provides the following effects and/or advantages.

According to the present invention, it is possible to provide a smart watch with a display unit including a circular activation area.

In addition, the smart watch has a design similar to the normal watch in that a user can check the current time even when the display unit is turned off. Moreover, the smart watch can provide time information even though the display unit is deactivated.

Moreover, since individual watch hands are independently driven, the display unit can provide a screen without any interruption or display the screen together with the time information.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings, which are given by illustration only, and thus are not limitative of the present invention, and wherein.

DETAILED DESCRIPTION OF THE INVENTION

Figure 1:
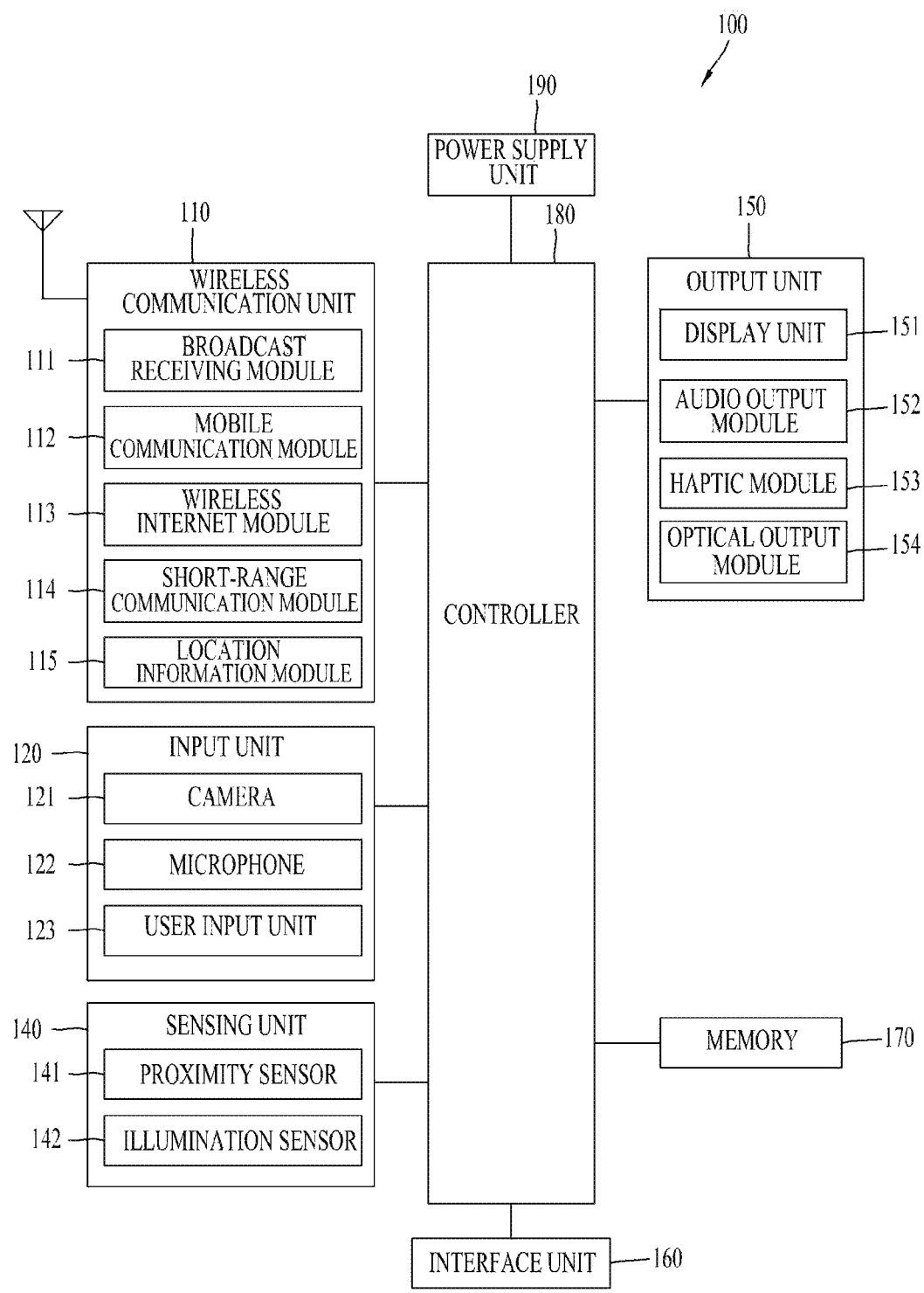
FIG. 1 is a block diagram for explaining a smart watch according to the present invention.

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be directly connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

The smart watch 100 is shown having components such as a wireless communication unit 110, an input unit 120, a sensing unit 140, an output unit 150, an interface unit 160, a memory 170, a controller 180, and a power supply unit 190.

It is understood that implementing all of the illustrated components in The FIG. 1 is not a requirement, and that greater or fewer components may alternatively be implemented.

More specifically, the wireless communication unit 110 typically includes one or more modules which permit communications such as wireless communications between the smart watch 100 and a wireless communication system, communications between the smart watch 100 and another smart watch, communications between the smart watch 100 and an external server. Further, the wireless communication unit 110 typically includes one or more modules which connect the smart watch 100 to one or more networks.

To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the smart watch, the surrounding environment of the smart watch, user information, and the like. For example, the sensing unit 140 may alternatively or additionally include other types of sensors or devices, such as a proximity sensor 141 and an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The smart watch 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the smart watch 100 and a user, as well as function as the user input unit 123 which provides an input interface between the smart watch 100 and the user.

The interface unit 160 serves as an interface with various types of external devices that can be coupled to the smart watch 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the smart watch 100 may perform assorted control functions associated with a connected external device, in response to the external device being connected to the interface unit 160.

The memory 170 is typically implemented to store data to support various functions or features of the smart watch 100. For instance, the memory 170 may be configured to store application programs executed in the smart watch 100, data or instructions for operations of the smart watch 100, and the like. Some of these application programs may be downloaded from an external server via wireless communication. Other application programs may be installed within the smart watch 100 at time of manufacturing or shipping, which is typically the case for basic functions of the smart watch 100 (for example, receiving a call, placing a call, receiving a message, sending a message, and the like). It is common for application programs to be stored in the memory 170, installed in the smart watch 100, and executed by the controller 180 to perform an operation (or function) for the smart watch 100.

The controller 180 typically functions to control overall operation of the smart watch 100, in addition to the operations associated with the application programs. The controller 180 may provide or process information or functions appropriate for a user by processing signals, data, information and the like, which are input or output, or activating application programs stored in the memory 170.

To drive the application programs stored in the memory 170, the controller 180 may be implemented to control a predetermined number of the components mentioned above in reference with FIG. 1A. Moreover, the controller 180 may be implemented to combinedly operate two or more of the components provided in the smart watch 100 to drive the application programs.

The power supply unit 190 can be configured to receive external power or provide internal power in order to supply appropriate power required for operating elements and components included in the smart watch 100. The power supply unit 190 may include a battery, and the battery may be configured to be embedded in the terminal body or configured to be detachable from the terminal body.

Some or more of the components may be operated cooperatively to embody an operation, control or a control method of the smart watch in accordance with embodiments of the present disclosure. Also, the operation, control or control method of the smart watch may be realized on the smart watch by driving of one or more application problems stored in the memory 170.

Figure 2:
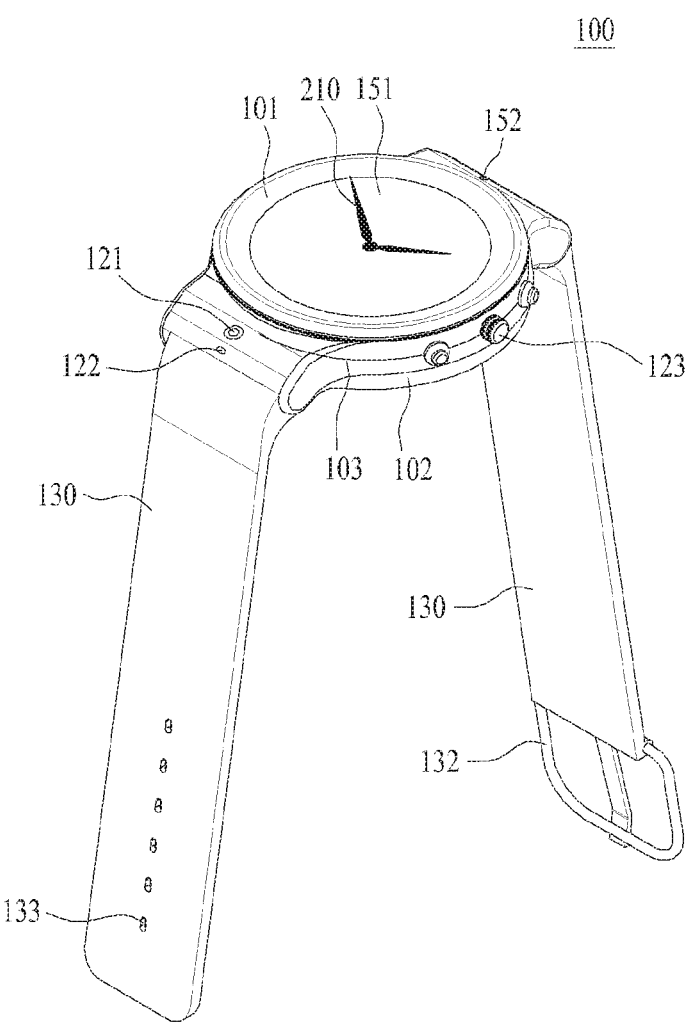
FIG. 2 is a perspective view of the smart watch according to the present invention.

FIG. 2 is a perspective view of an embodiment of the smart watch 100 according to the present invention. Referring to FIG. 2, the smart watch 100 includes a main body on which the display unit 151 is mounted and a band 130, which is connected to the main body, configured to be wearable on the wrist. A case forming an exterior of the main body may include a front case 101 disposed on the front surface, a rear case 102 disposed on the rear surface, and a side case 103 disposed along the side circumference. In addition, various electronics components such as a main board 181 on which electronic devices for controlling the smart watch are mounted, the camera 121, and the audio output module 152 may be included in an inner space defined by the case.

The smart watch 100 is configured to perform wireless communication, and to this end, an antenna can be installed in the main body. Meanwhile, functions of the antenna may be extended using the case 101. For example, the case 101 may be made of a conductive material and electrically connected to the antenna to extend a ground area or a radiation area.

The display unit 151 may be disposed on the front surface of the main body so that information can be displayed. In some embodiments, the display unit 151 includes a touch sensor so that the display unit 151 can be implemented as a touch screen. As illustrated in the drawing, a window 107 of the display unit 151 may be disposed on the first case 101 so that the front surface of the smart watch 100 may be formed by the window 107 and the first case 101.

According to the present invention, watch hands 210 are included between the display unit 151 and the window 107. Thus, the smart watch 100 can provide time information through the watch hands 210 even when there is no screen on the display unit 151. That is, the smart watch 100 can be used as an analog watch. Since a conventional smart watch displays virtual hands on its display unit, the conventional smart watch and the analog watch are somewhat different in appearance, and thus many users have a sense of resistance. However, according to the present invention, the smart watch 100 uses the watch hands 210 like the analog watch, and thus the appearance similarity can be maximized.

Although watch hands generally include hour, minute, and second hands, if the watch hands 210 are configured to include all the hands, the amount of information displayed on the display unit 151 may be limited. Thus, the smart watch 100 according to the present invention may include hour and minute hands only due to the limited amount of information displayed on the display unit 151.

The audio output unit 152, the camera 121, the microphone 122, and the user input unit 123 can be disposed on the main body. When the display unit 151 is implemented as the touch screen, the display unit 151 can work as the user input unit 123. Thus, additional function keys may not be provided to the main body.

The band 130 is commonly worn on the user's wrist and may be made of a flexible material for facilitating wearing of the smart watch 100. As one example, the band 130 may be made of leather, rubber, silicon, synthetic resin, or the like. The band 130 may also be configured to be detachable from the main body. Accordingly, the band 130 may be replaced with various types of bands according to a user's preference.

The band 130 may include a fastener 132. The fastener 132 may be implemented using a buckle, a snap-fit hook structure, Velcro, or the like, and include a flexible section or material. The drawing illustrates an example in which the fastener 132 is implemented using a buckle. Specifically, when the buckle type of fastener 132 is provided, a hole 133 into which a fixed pin of the buckle is inserted may be formed at the opposite side of the fastener 132 of the band 130.

Figure 3:
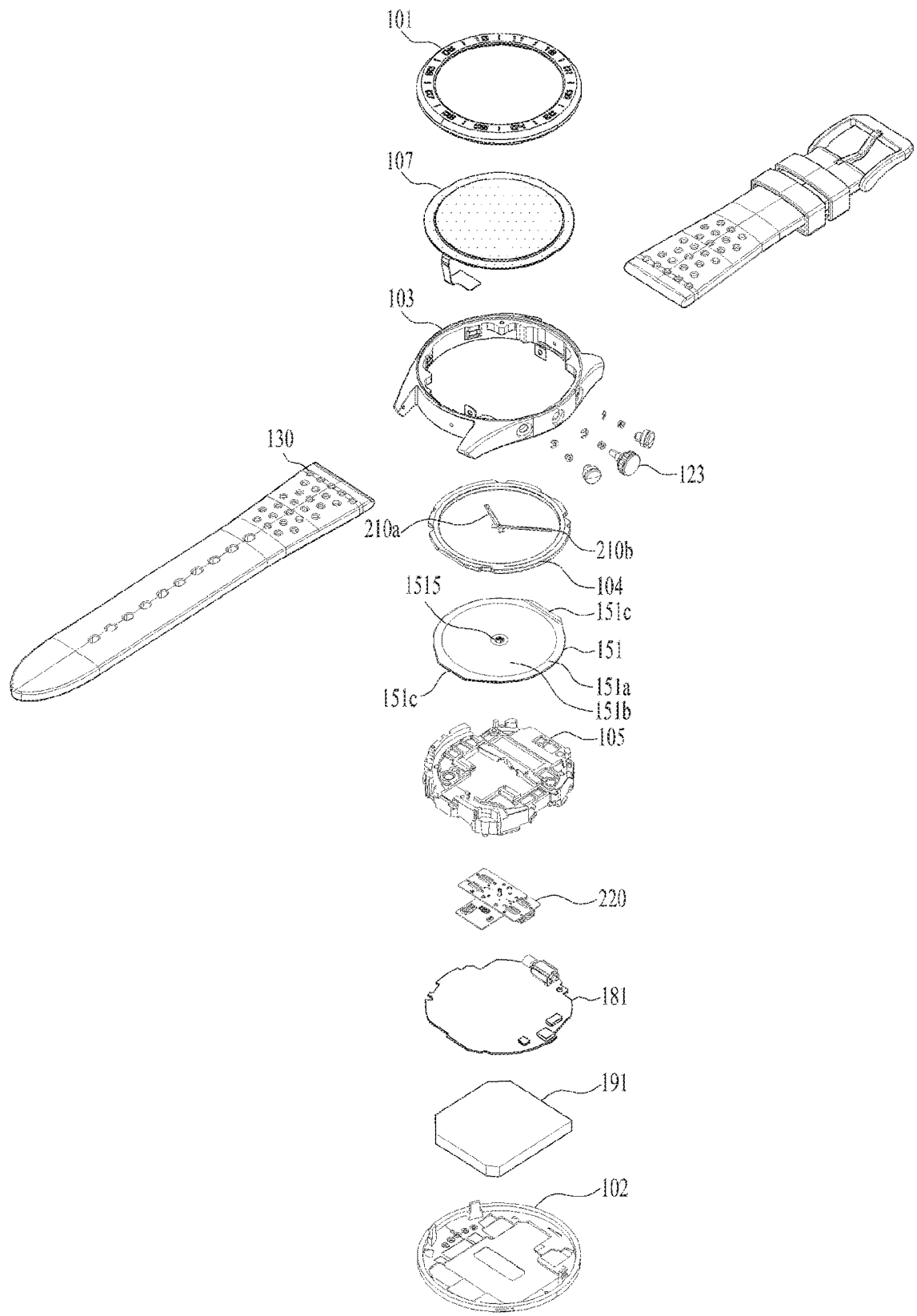
FIG. 3 is an exploded perspective view of the smart watch according to the present invention.

FIG. 3 is an exploded perspective view of the smart watch 100 according to the present invention. The front case 101 is formed in the shape of a ring such that the front case 101 covers and surrounds the display unit 151 and the watch hands 210. In addition, the transparent window 107 is disposed on an open area to allow a user to check information provided by the display unit 151 and the watch hands 210. In this case, the window 107 may include a touch sensor for receiving a touch input, and a flexible board for sending the touch input to the main board 181 may be provided at one side thereof.

The side case 103 is formed in the shape of a ring that surrounds the side circumference of the smart watch 100. The side case 103 may forms an inner space together with the front case 101 disposed on the front of the side case 103 and the rear case 102 disposed on the back of the side case 103. In addition, a bracket 105, the display unit 151, the main board 181, and a battery 191 are mounted within the inner space.

Figure 4:
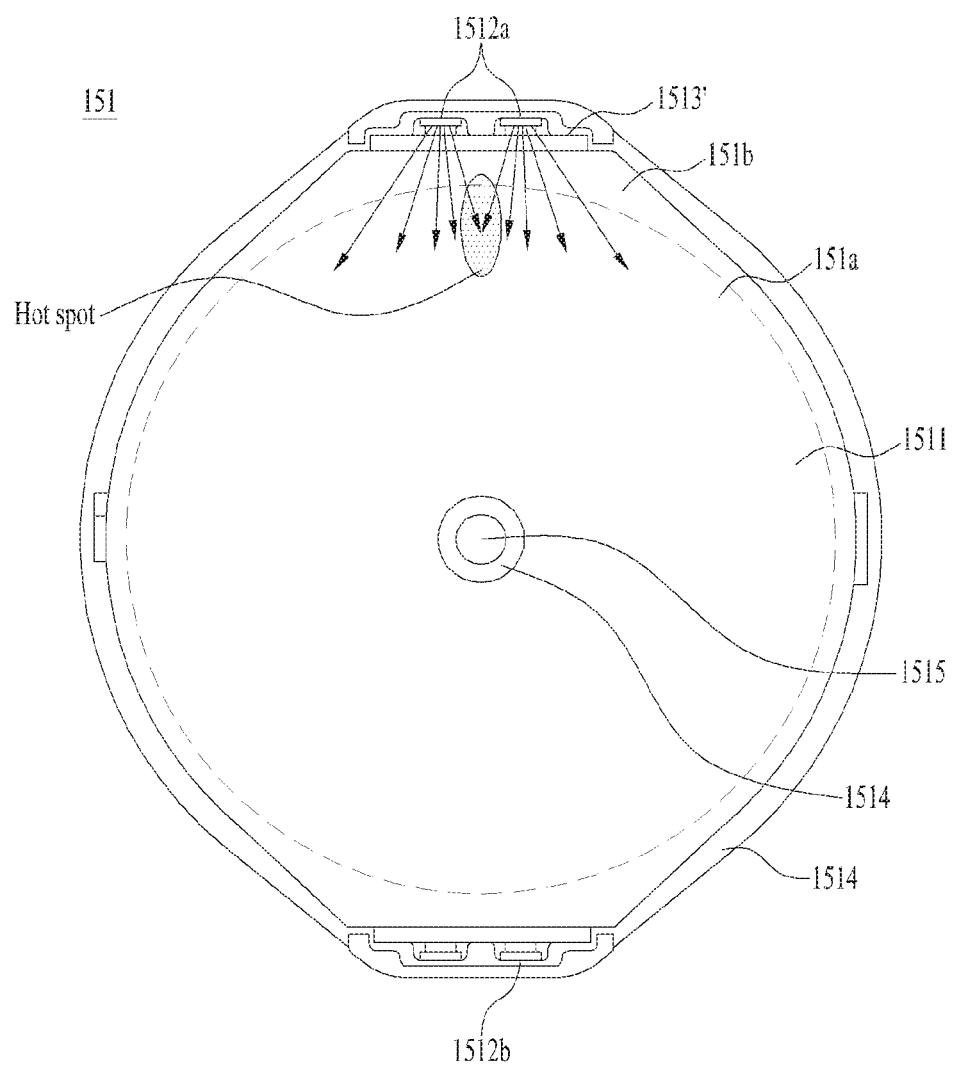
FIG. 4 is a plan view of the front surface of a display unit of the smart watch according to the present invention.

FIG. 4 is a plan view of the front surface of a display unit of the smart watch according to the present invention.

The display unit is configured to display image information and includes a circular activation area 151a. Since a normal watch uses a circular disc, it is desirable that the activation area 151a in which an image is displayed is formed in the shape of a circle to have the similar shape with that of the normal watch. A deactivation area 151b is disposed along the circumference of the activation area 151a, and no image is displayed in the deactivation area 151b. A signal line through which a signal for controlling each pixel of the display unit 151 is transmitted and received is disposed in the deactivation area 151b.

According to the present invention, since the watch hands 210 are disposed on the front surface of the display unit 151 of the smart watch 100, a shaft 226 for rotating the watch hands 210 penetrates a center hole 1515 of the display unit 15. In the case of an organic light emitting diode, since it is a semiconductor, sealing cannot be performed if the center hole 1515 is formed, and a problem such as oxidation, corrosion, or the like may occur. However, in the case of a liquid crystal panel 1511, a liquid crystal display can be implemented by forming the center hole 1515, sealing the vicinity of the center hole 1515, and inserting a liquid crystal into a space in the shape of a donut.

However, since the liquid crystal display requires the light source 1512 that emits light, a space for accommodating the light source 1512 should be provided. To form the liquid crystal panel 1511, the liquid crystal is inserted between a pair of glasses, and then electrodes and color filters are coated on the glass pair. A light guide plate 1513 for consistently emitting light toward the front surface (in the front direction) by scattering light is disposed beyond the liquid crystal panel 1511, and light sources 1512a and 1512b are disposed at both sides of the light guide plate 1513. By scattering light provided by an LED, i.e., the light source 1512 located at one side of the light guide plate 1513, it is possible to emitting light toward the liquid crystal panel 1511, i.e., in the front direction.

When the light sources 1512a and 1512b are located at one side, there may be a dimmed area because no light arrives at the opposite side with respect to the center hole 1515, i.e., the side where the light source is not located. According to the present invention, to solve this problem, the display unit 151 may include the light sources 1512a and 1512b at both sides, respectively.

Specifically, the first light resource 1512a provided at one side and the second light resource 1512b provided at the other side may be disposed on a straight line together with the center hole 1515. In this case, since a bezel at the top and bottom of the main body, where the band 130 is connected, is greater than that at the left and right of the main body, the light sources 1512 may be disposed at the top and bottom of the main body.

The signal line for controlling an electrode of each pixel of the liquid crystal panel 1511 is extended along the bezel part. In addition, collected signal lines are connected to the main board 181 through display boards 1517a and 1517b. Since a deactivation area in the part in where the signal lines are connected to the display boards 1517a and 1517b is large, the liquid crystal panel 1511 may have a modified circle shape where one side and the other side are protruded to implement the circular activation area 151a.

In addition, considering that a space for diffusing light emitted from the light sources 1512a and 1512b needs to be formed at locations close to the sides at which the light sources 1512a and 1512b are disposed, the light guide plate may be protruded at the sides where the light sources 1512a and 1512b are disposed. Therefore, according to the present invention, the display unit 151 of the smart watch 100 may be configured with a light incident part 1513', of which two sides are protruded, and the circular activation area 151a. In this case, a part of the light incident part 1513' may be included in the deactivation area 151b.

According to the present invention, a plurality of LEDs can be provided for each of the first and second light sources 1512a and 1512b. Since an area where the light source 1512 can be disposed is smaller than a rectangular liquid crystal display even though the protruded parts are present, a spacing between LEDs is smaller than the common rectangular liquid crystal display. When a spacing between LEDs is small, there may be a hot spot where light emitted from a pair of LEDs overlaps, and thus, the hot spot may be extremely bright. To prevent the screen from having different brightness, light emitted from the hot spot toward the front surface can be reduced by minimizing intensity of the scattering pattern, which is formed by the light guide plate 1513 in a portion corresponding to a plurality of LEDs.

Moreover, by providing liquid crystal frames 1514 that cover a side circumference of the liquid crystal display and an inside wall of the center hole 1515, it is possible to prevent light scattered at the light guide plate 1513 from leaking to the side. Since the light shielding effect of a bright color such as white is relatively low, it is desired that the liquid crystal frames 1514 have a black color.

Figure 5:
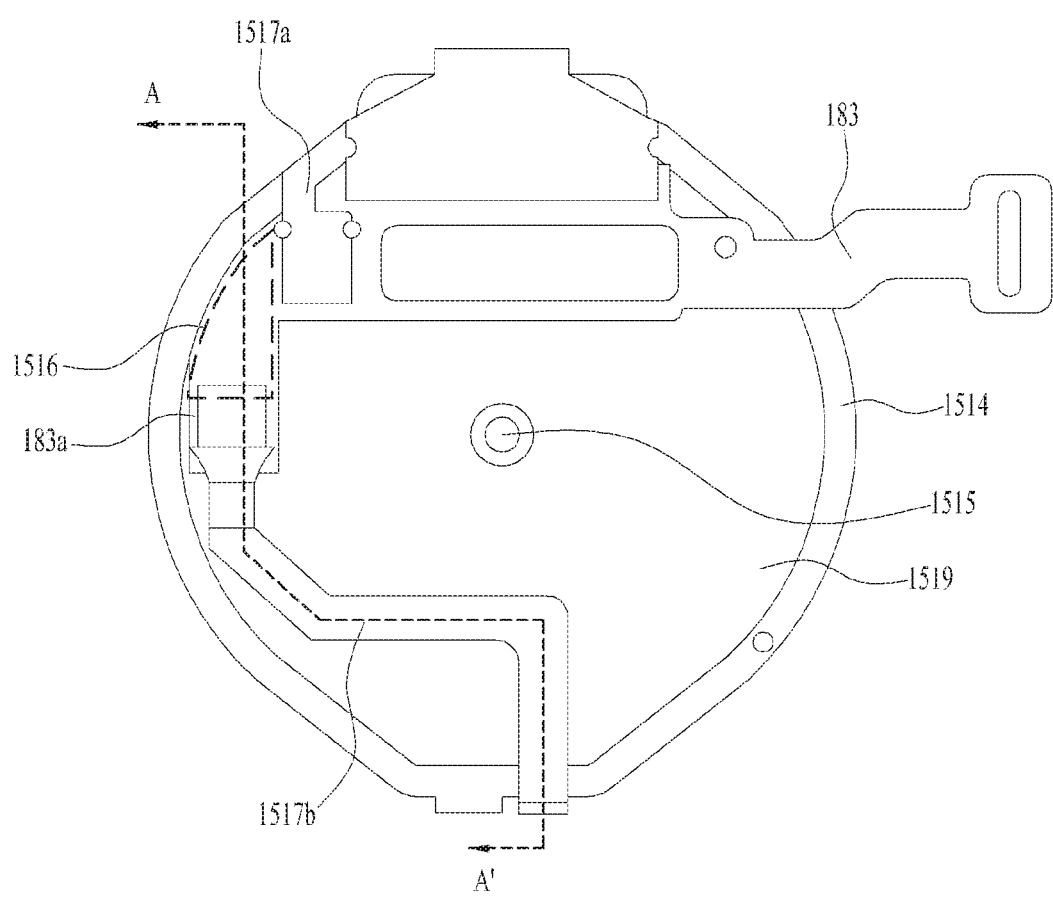
FIG. 5 is a plan view of the rear surface of the display unit of the smart watch according to the present invention.
Figure 6:
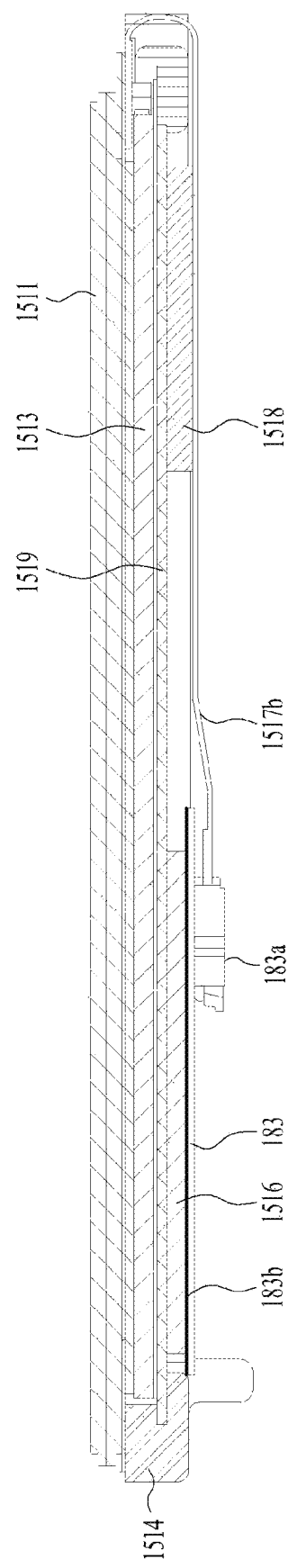
FIG. 6 is a cross-sectional view of A-A shown in FIG. 5.

FIG. 5 is a plan view of the rear surface of the display unit 151 of the smart watch 100 according to the present invention, and FIG. 6 is a cross-sectional view of A-A shown in FIG. 5. Since the LED is disposed at both sides, the display boards 1517a and 1517b are respectively connected to one side and the other side of the display unit 151. In this case, the display boards 1517a and 1517b may be made of a flexible material so that the display boards 1517*a* and 1517*b* can bend toward the rear surface.

Since only a single driver chip is required to operate the display unit 151, the extended sides of the display boards 1517*a* and 1517*b* are connected to the single driver chip. The driver chip may be mounted on a connection board 183 for connecting the display boards 1517*a* and 1517*b* to the main board 181. One of the display boards 1517*a* and 1517*b* may be connected to the connection board 183 through a connector.

To prevent damage to the display unit 151 and other peripheral components caused when static electricity flows into the display unit 151, an electrostatic discharge (ESD) structure for transmitting the static electricity to the ground is needed. According to the present invention, a metal plate 1519 may be disposed on the rear surface of the display unit 151. The metal plate 1519 may increase hardness of the display unit 151. In addition, since metal is a conductive material (e.g. SUS (stainless steel)), static electricity applied to the display unit 151 can be transmitted to the ground using the metal plate 1519.

Since the connection board 183 is connected to the ground of the main board 181, by exposing a grounding pad 183*b* of the connection board 183 to the outside and connecting it to the metal plate 1519, the static electricity applied to the display unit 151 can be transmitted to the ground using the metal plate 1519. To this end, to maintain the connection between the metal plate 1519 and the grounding pad 183*b* of the connection board 183, a conductive tape 1516, which corresponds to a conductive material with adhesion, may be disposed between the grounding pad 183*b* and the metal plate 1519. The conductive tape 1516 may be used to fix the display boards 1517*a* and 1517*b* and the connection board 183, which are located on the rear surface of the display unit 151. Since if a size of the conductive tape 1516 is small, it does not have sufficient adhesion and power for discharging static electricity, the conductive tape 1516 may be disposed over an area as wide as possible.

When the conductive tape 1516 is disposed between the connection board 183 and the rear surface of the display unit 151, a spacer 1518 for separating the display boards 1517*a* and 1517*b* from the rear surface of the display unit 151 by a predetermined distance may be provided. Since if the connection board 183 is located close to the first display board 1517*a*, the first display board 1517*a* needs to have a relatively short length and the second display board 1517*b* needs to have a relatively long length, the spacer 1518 may be provided to only the second display board 1517*b*.

The spacer 1518 can separate the second display board 1517*b* by a distance similar to that between the second display board 1517*b* and the display unit 151, and thus prevent a portion, where the second display board 1517*b* and the connection board 183 are connected to each other, from bending. In addition, the spacer 1518 can provide a space for allowing the bending portion of the second display board 1517*b*, which bends from the front to the back of the display unit 151, to bend in a curve. Since the space 1518 has an adhesive member, the second display board 1517*b* may be disposed on the rear surface of the display unit 151. As illustrated in FIG. 6, since the display board 1517 is connected to a rear surface of the connection board 183 through a connector 183*a*, the spacer 1518 may have a thickness similar to or greater than that of the grounding pad.

Referring back to FIG. 3, the bracket 105 is located on the rear surface of the display unit 151. The bracket 105 is configured to support the front display unit 151 of the smart watch 100 and include an opening where a movement 220 is inserted. In addition, the battery may be disposed between a rear surface of the bracket 105 and the main board.

Figure 7:
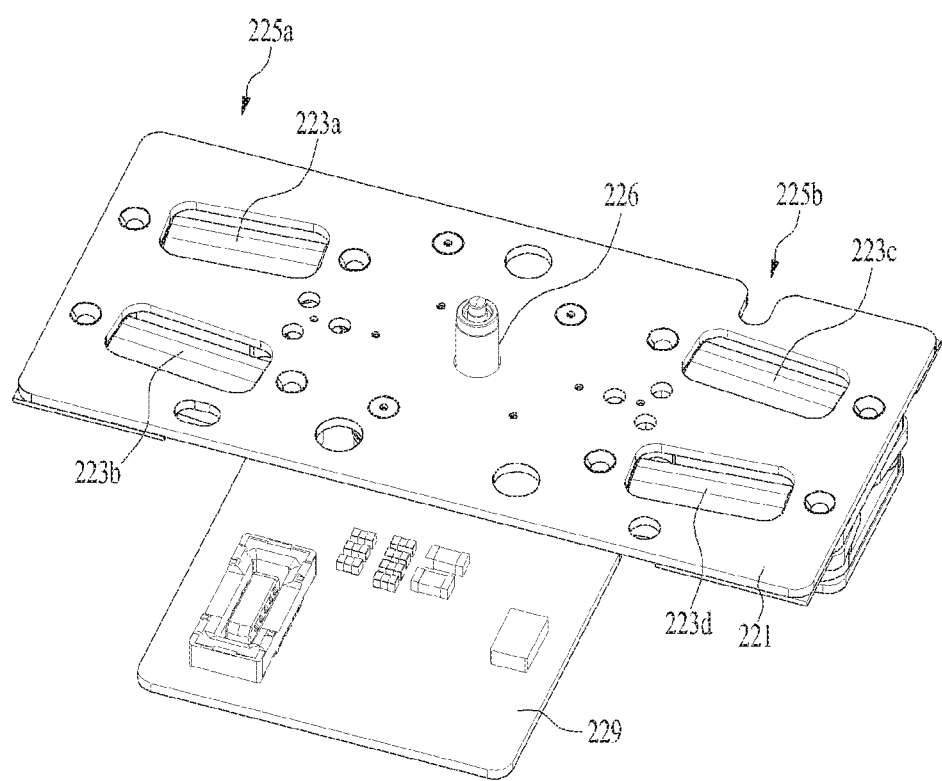
FIG. 7 is a perspective view of a movement of the smart watch according to the present invention.
Figure 8:
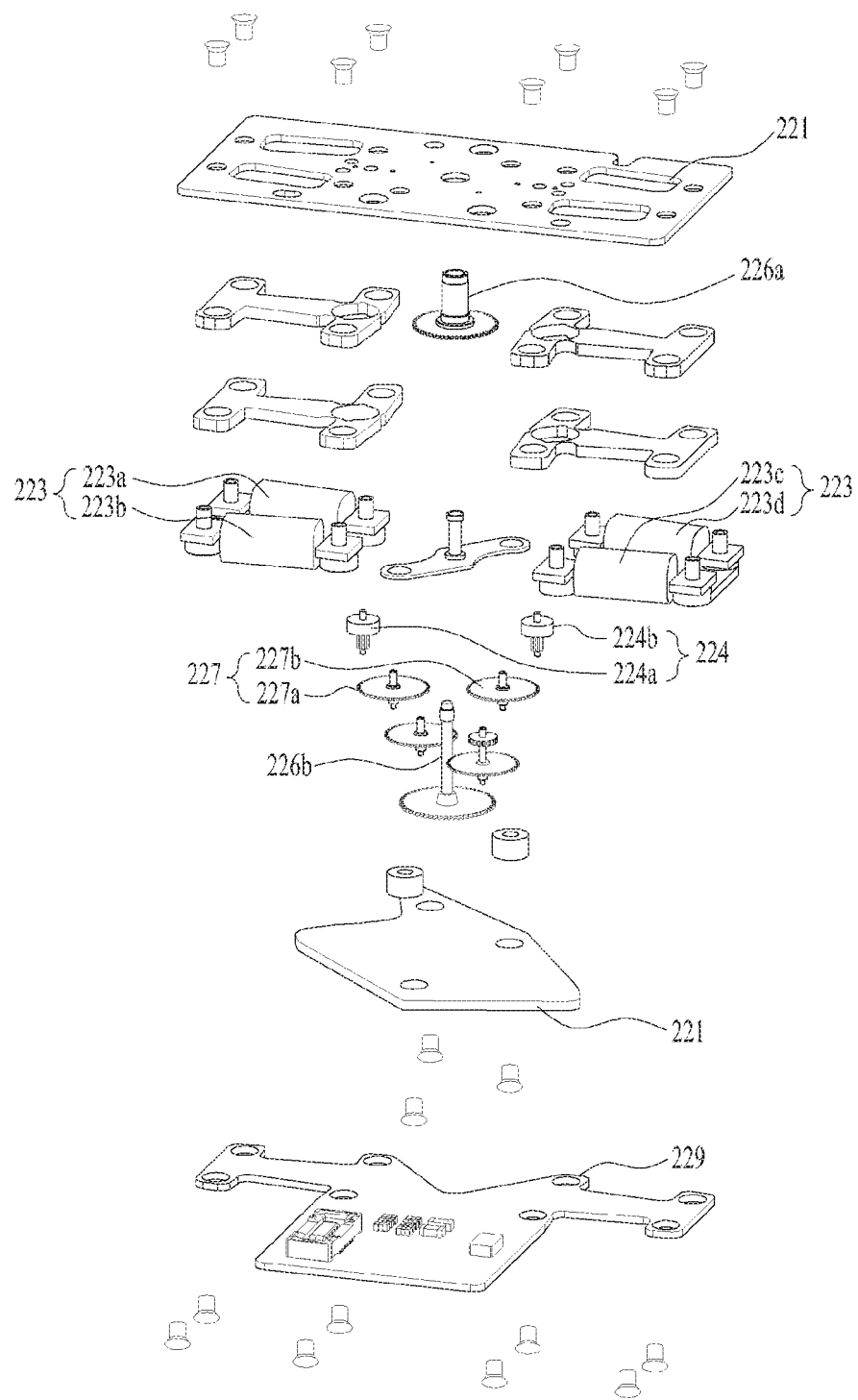
FIG. 8 is an exploded perspective view of the movement shown in FIG. 7.

FIG. 7 is a perspective view of the movement 220 of the smart watch according to the present invention, and FIG. 8 is an exploded perspective view of the movement 220 shown in FIG. 7.

The movement 220 may include watch hands 210, an electromagnet for driving the watch hands 210, a magnet 224, a gear 227, and the shaft 226. In addition, the movement 220 may include a movement board 229 for controlling the electromagnet 223 and a cover 221 that covers the top and bottom of the movement 220 for modularization.

According to the present invention, the watch hands 210 includes a first watch hand 210*a* for representing an hour and a second watch hand 210*b* for representing a minute. In the case of a normal watch, when a minute hand is rotated by a predetermined angle in accordance with movement of a second hand, an hour hand is rotated by an angle corresponding to the rotation angle of the minute hand, using a gear.

However, the first watch hand 210*a* and the second watch hand 210*b* may respectively include a first driving part 225*a* for independently moving the first watch hand 210*a* and a second driving part 225*a* for independently moving the second watch hand 210*b*. By independently driving the watch hands 210, it is possible to provide not only time information but also various visual information by moving the first and second watch hands 210*a* and 210*b* according to a screen displayed on the display unit 151.

The first driving part 225*a* is connected to the gear 227 consisting of a plurality of toothed wheels, which controls the first watch hand 210*a* to move by an angle of 6° (or less), and rotates a first shaft 226*a* connected to the first watch hand 210*a*. If electricity is applied to electromagnets 223*a* and 223*b*, the magnet 224 close to the electromagnet 223 is rotated, and torque is delivered to the first watch hand 210*a* through the gear 227. The second driving part 225*a* has the similar structure.

In this case, since a single electromagnet 223*a* or 223*c* can rotate the magnet 224*a* or 224*b* in one direction, another electromagnet 223*b* or 223*d* is required to rotate the magnet 224*a* or 224*b* in the opposite direction. That is, the electromagnet pair 223*a* and 223*b* or 223*c* and 223*d*, the magnet 224*a* or 224*b*, and gears for delivering torque of the magnet 224*a* or 224*b* to shaft 226*a* or 226*b* are required to drive a single watch hands 210*a* or 210*b*. In other words, four electromagnets 223*a* to 223*d* are required to respectively drive the two watch hands 210*a* and 210*b*.

To dispose a single magnet 224*a* or 224*b* between an electromagnet pair 223*a* and 223*b* or 223*c* and 223*d*, there should be a sufficient distance between the electromagnet pair 223*a* and 223*b* or 223*c* and 223*d*. However, to minimize a space occupied by the electromagnets 223, the electromagnets 223 may be disposed in a V shape by widening a spacing between portions close to the magnet 224*a* or 224*b* and narrowing a spacing between portions away from the magnet 224*a* or 224*b*.

The first shaft 226*a* connected to the first watch hand 210*a* and the second shaft 226*b* connected to the second watch hand 210*b* independently move, and a part of the second shaft 226*b* may be disposed inside of the first shaft 226*a*.

Considering that the movement 220 is disposed by penetrating the bracket 105 as shown in FIG. 3, a hollow space of the bracket 105 can be reduced as a space occupied by the movement 220 is decreased. That is, by reducing the hollow space of the bracket 105, the hardness of the smart watch 100 can be increased. To minimize the size of the movement 220, the first and second driving parts 225a and 225b can be disposed on a straight line. When the first and second driving parts 225a and 225b are disposed on the straight line, the magnet 224a of the first driving part 225a and the magnet 224b of the second driving part 225b may be located on the straight line with the shaft 226.

Referring to FIG. 3, a dial mold 104 may be further included between the front surface of the display unit 151 and the window 107. The dial mold 104 can provide a space for allowing the watch hands 210 to rotate between the display unit 151 and the window 107. In addition, since the dial mold 104 has a dark color, it can also prevent light generated at the circumference of the liquid crystal panel 1511 from leaking. Moreover, if the dial mold 104 is made of a material with adhesion, it can further prevent water from leaking from a space between the glass and the front case 101.

Figure 9:
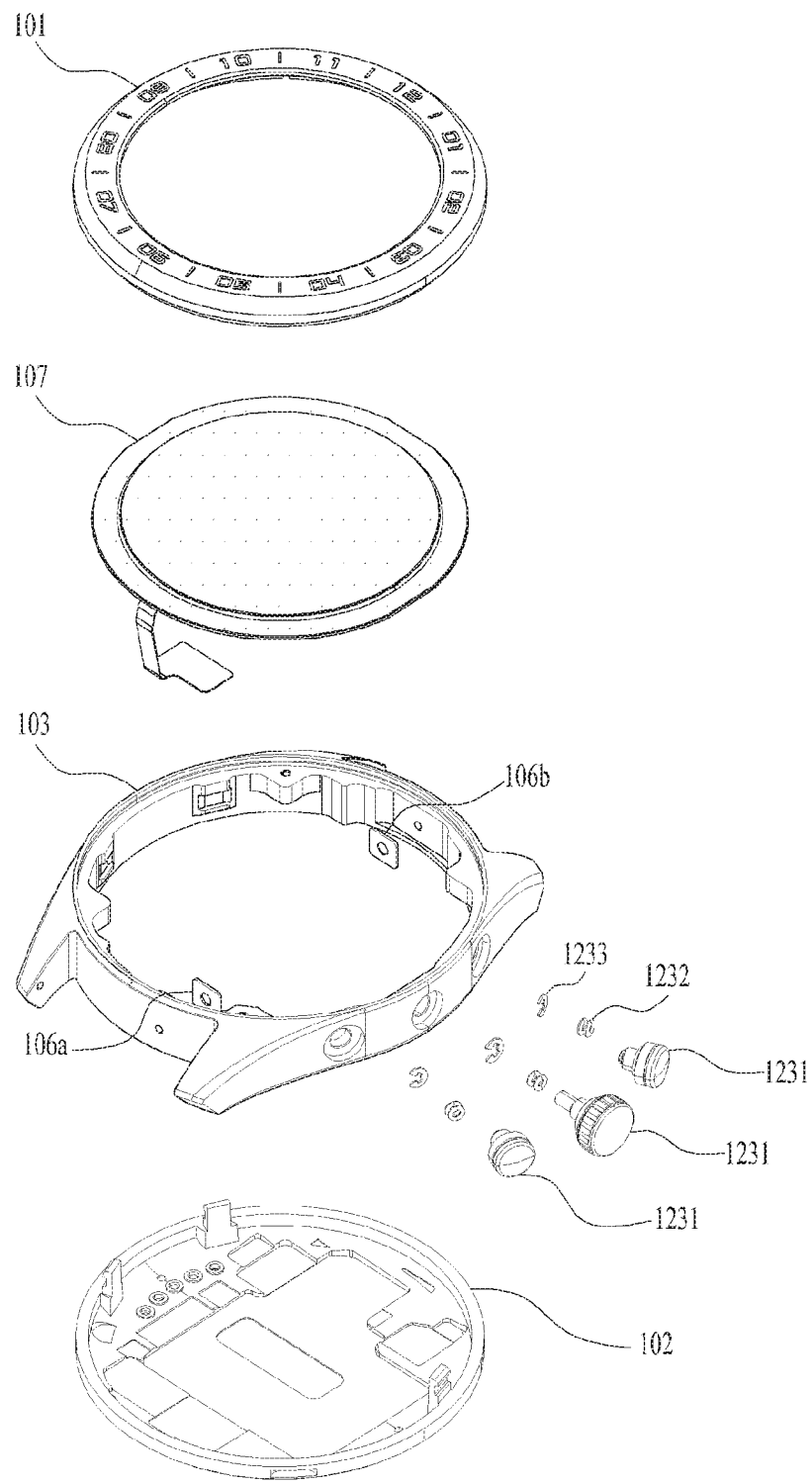
FIG. 9 is an exploded perspective view illustrating cases and a user input unit of the smart watch according to the present invention.

FIG. 9 is an exploded perspective view illustrating cases and a user input unit 123 according to the present invention. According to the present invention, the user input unit 123 may be disposed on the side surface of the smart watch 100. In the case of a normal watch, a crown is used to set time, that is, time is set by turning the crown. However, according to the present invention, the user input unit 123 may be used to move a cursor on the display unit 151, scroll a screen, and adjust volume as well as set time. Further, a user may input a command by pressing or turning the user input unit 123.

The user input unit 123 located on the side surface of the smart watch 100 may be formed in the shape of a pin where a diameter of a circle exposed to the outside is greater than that of a circle located close to the main body. In addition, a C-ring 1233 for fixing the inner part of the user input unit 123 such that the user input unit is fixed to the side case 103 may be further included. Moreover, an O-ring 1232, which is made of an elastic material, for preventing water from flowing into the side case 103 through a hole where the user input unit 123 is inserted may be further included.

The smart watch 100 may further include mesh filters 106a and 106b, which are located at a hole for the microphone 122 or an air hole for adjusting atmospheric pressure. The mesh filters 106a and 106b may be configured to allow gas to pass therethrough but prevent liquid from passing, thereby maintaining the waterproofing performance.

According to the present invention, it is possible to provide a smart watch with a display unit including a circular activation area.

In addition, the smart watch has a design similar to the normal watch in that a user can check the current time even when the display unit is turned off. Moreover, the smart watch can provide time information even though the display unit is deactivated.

Further, since individual watch hands are independently driven, the display unit can provide a screen without any interruption or display the screen together with the time information.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

What is claimed is:

1. A smart watch comprising:
a case;
a window disposed at a front side of the case;
a display unit mounted in the case and comprising a center hole;
a movement disposed at a rear side of the display unit and comprising a shaft configured to be passed through the center hole;
a watch hand disposed between the display unit and the window and configured to be rotated about the shaft; and
a main board configured to control the display unit and the movement,
wherein the display unit comprises:
a liquid crystal panel;
a light guide plate disposed at a rear side of the liquid crystal panel, wherein the light guide plate includes a protruding first end of the light guide plate and a protruding second end of the light guide plate; and
a first light source providing light to the first end of the light guide plate and a second light source providing light to the second end of the light guide plate,
wherein the center hole is centrally located between the first and second light sources.

2. The smart watch of claim 1, wherein the first light source and second light source are configured to provide the light to first and second light incident surfaces, respectively, wherein the first and second light incident surfaces are respectively positioned at the protruding first end and the protruding second end of the guide plate.

3. The smart watch of claim 1, wherein the display unit further comprises:
a circular activation area; and
a deactivation area located along a circumference of the circular activation area,
wherein the first and second light incident surfaces are adjacent to the deactivation area.

4. The smart watch of claim 3, wherein:
each of the first and second light sources comprises a pair of light emitting diode (LED) units;
the light guide plate is configured to cause a scattering pattern of light from the first and second light sources, and
wherein the scattering pattern reduces an intensity of light at hot spots corresponding to overlapping regions of light emitted from each pair of LED units of the first and second light sources.

5. The smart watch of claim 1, wherein the display unit further comprises black liquid crystal frame portions disposed along an outer circumference of the display unit and an inner circumference of the center hole.

6. The smart watch of claim 1, further comprising a connection board comprising a first end connected to the main board and a second end disposed at a rear surface of the display unit, wherein the display unit further comprises:
a metal plate disposed at the rear side of the display unit;
a first display board extending between the first light source and the connection board; and
a second display board extending between the second light source and the rear surface of the display unit, wherein the second display board comprises a connector of the connection board.

7. The smart watch of claim 6, wherein the connection board comprises a grounding pad electrically coupled to the metal plate via conductive tape.

8. The smart watch of claim 7, further comprising a spacer disposed between the metal plate and the second display board, wherein a thickness of the spacer is greater than or equal to a thickness of the conductive tape.

9. The smart watch of claim 1, wherein the movement comprises:
a gear part coupled to the shaft;
a magnet coupled to the gear part and configured to rotate;
a first electromagnet disposed at a first side of the magnet and configured to cause clockwise rotation of the magnet; and
a second electromagnet disposed at a second side of the magnet and configured to cause counterclockwise rotation of the magnet.

10. The smart watch of claim 9, wherein a distance between a first side of the first electromagnet and a corresponding first side of the second electromagnet is greater than a distance between a second side of the first electromagnet and a corresponding second side of the second electromagnet, wherein the magnet is disposed closer to the first sides of the first and second electromagnets.

11. The smart watch of claim 1, wherein:
the watch hand comprises a first watch hand and a second watch hand;
the shaft comprises a first shaft coupled to the first watch hand and a second shaft coupled to the second watch hand; and
at least part of the second shaft is located inside the first shaft.

12. The smart watch of claim 11, wherein the movement comprises:
a first driving part configured to cause rotation of the first shaft and including a first magnet disposing one side of the shaft, and
a second driving part configured to cause rotation of the second shaft and including a second magnet,
wherein the first and second electromagnets and the shaft are aligned along a straight line.

13. The smart watch of claim 1, further comprising a ring-shaped dial mold disposed to define a space between the window and the display unit to allow the watch hand to rotate within the space.

14. The smart watch of claim 1, further comprising two bands coupled to a first end and a second end of the case, wherein the first and second ends of the light guide plate are respectively positioned corresponding to the first and second ends of the case.

* * * * *